US012744226B2

(12) United States Patent
Woo

(10) Patent No.: US 12,744,226 B2
(45) Date of Patent: Sep. 22, 2026

(54) HEAT EXCHANGER ASSEMBLY

(71) Applicants: HYUNDAI MOTOR COMPANY, Seoul (KR); Kia Corporation, Seoul (KR)

(72) Inventor: Myeong Nam Woo, Yongin-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 155 days.

(21) Appl. No.: 18/625,717

(22) Filed: Apr. 3, 2024

(65) Prior Publication Data

US 2024/0339637 A1 Oct. 10, 2024

(30) Foreign Application Priority Data

Apr. 4, 2023 (KR) ........................ 10-2023-0044313

(51) Int. Cl.
*H01M 8/04029* (2016.01)
*H01M 8/04007* (2016.01)

(52) U.S. Cl.
CPC ... *H01M 8/04029* (2013.01); *H01M 8/04067* (2013.01)

(58) Field of Classification Search
CPC ...................... H01M 8/04029; H01M 8/04067
USPC ........................................................ 165/80.4
See application file for complete search history.

(56) References Cited

U.S. PATENT DOCUMENTS

2006/0162911 A1* 7/2006 Oh ........................ F28F 9/0282 165/176

FOREIGN PATENT DOCUMENTS

JP 4614688 B2 * 1/2011 ........ H01M 8/04067
WO WO-2012046192 A1 * 4/2012 .......... H01M 8/2483

* cited by examiner

*Primary Examiner* — Len Tran
(74) *Attorney, Agent, or Firm* — MORGAN, LEWIS & BOCKIUS LLP

(57) ABSTRACT

A heat exchanger assembly is provided. The heat exchanger assembly includes a first heat exchange part configured to cool an electrical equipment of a fuel cell, a second heat exchange part that cools a fuel cell stack, and a body part connecting the first heat exchange part and the second heat exchange part. The body part includes a first opening that opens in a first direction, and the first heat exchange part is disposed in the first opening, and a second opening that opens in a second direction, and the second heat exchange part is disposed in the second opening. The first direction is a direction in which the body part faces the first heat exchange part, and the second direction is opposite to the first direction.

9 Claims, 4 Drawing Sheets

HEAT EXCHANGER ASSEMBLY

CROSS-REFERENCE TO RELATED APPLICATION

This application claims the benefit under 35 USC § 119(a) of Korean Patent Application No. 10-2023-0044313, filed on Apr. 4, 2023, in the Korean Intellectual Property Office, the entire disclosure of which is incorporated herein by reference for all purposes.

BACKGROUND

1. Field

The following description relates to a heat exchanger assembly for a ship.

2. Description of Related Art

A fuel cell system is a system that continuously produces electric energy through a chemical reaction of a fuel that is continuously supplied, and it is beneficial to develop an alternative system to solve global environmental problems.

Among these systems, a hydrogen fuel cell system refers to a system that produces electric power by supplying hydrogen and oxygen to a stack through fuel processing system (FPS) and air processing system (APS) modules.

To apply the hydrogen fuel cell system, a heat exchanger that cools the device is necessary. Typically, cooling using air is widely used.

Recently, a method for installing a hydrogen fuel cell system on an unmanned watercraft has been developed. However, because the unmanned watercraft is operated on water, waterproofing is essential, making it difficult to utilize cooling utilizing air.

In this example, a water cooling method that uses a coolant may be considered, but the water-cooled heat exchanger basically includes a weight of the coolant and is heavy, and thus, a separate structure for mounting it is necessary.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a heat exchanger assembly includes a first heat exchange part configured to cool electrical equipment of a fuel cell; a second heat exchange part configured to cool a fuel cell stack; and a body part configured to connect the first heat exchange part and the second heat exchange part, wherein the body part includes a first opening that opens in a first direction, and the first heat exchange part is disposed in the first opening; and a second opening that opens in a second direction, and the second heat exchange part is disposed in the second opening, wherein the first direction is a direction in which the body part faces the first heat exchange part, and the second direction is opposite to the first direction.

The body part may further include a first heat dissipating member which includes the first opening; a second heat dissipating member, disposed in the second direction, and which includes the second opening; and a body member, disposed between the first heat dissipating member and the second heat dissipating member, and configured to connect the first heat dissipating member and the second heat dissipating member.

A length of the first heat dissipating member along the first direction may be different from a length of the second heat dissipating member along the first direction.

The first heat exchange part may include a plurality of first plate-shaped members stacked along the first direction, the second heat exchange part comprises a plurality of second plate-shaped members stacked along the second direction, wherein the plurality of first plate-shaped members are disposed in the first opening, and wherein the plurality of second plate-shaped members are disposed in the second opening.

A number of the first plate-shaped members may be different from a number of the second plate-shaped members, the length of the first heat dissipating member along the first direction may correspond to a length of the plurality of stacked first plate-shaped members along the first direction, and a length of the second heat dissipating member along the second direction may correspond to a length of the plurality of stacked second plate-shaped members along the second direction.

The first heat dissipating member may include a first heat dissipating member body that defines the first opening; and a first pin part that protrudes in the second direction from a side surface of the first heat dissipating member body, and the second heat dissipating member may include a second heat dissipating member body that defines the second opening; and a second pin part that protrudes in the first direction from a side surface of the second heat dissipating member body.

A plurality of first pin parts may be disposed in a vertically stacked direction, and a plurality of second pin parts may be arranged along the vertically stacked direction.

The body part may be configured to have an interior hole that passes therethrough along the first direction, and the first pin part and the second pin part may be disposed in the interior hole.

The body member may include an introduction passage that is communicated with the interior hole, and is configured such that an external cooling fluid is introduced therethrough; and a discharge passage that is communicated with the interior hole, and is configured such that the external cooling fluid is discharged therethrough.

A length of the first heat dissipating member, a length of the second heat dissipating member, and a length of the body member correspond to each other in a vertical direction, and wherein an area, in which the first heat dissipating member and the body member contact each other, and an area, in which the second heat dissipating member and the body member contact each other, are laser-welded to each other.

Other features and aspects will be apparent from the following detailed description, the drawings, and the claims.

Figure 1:
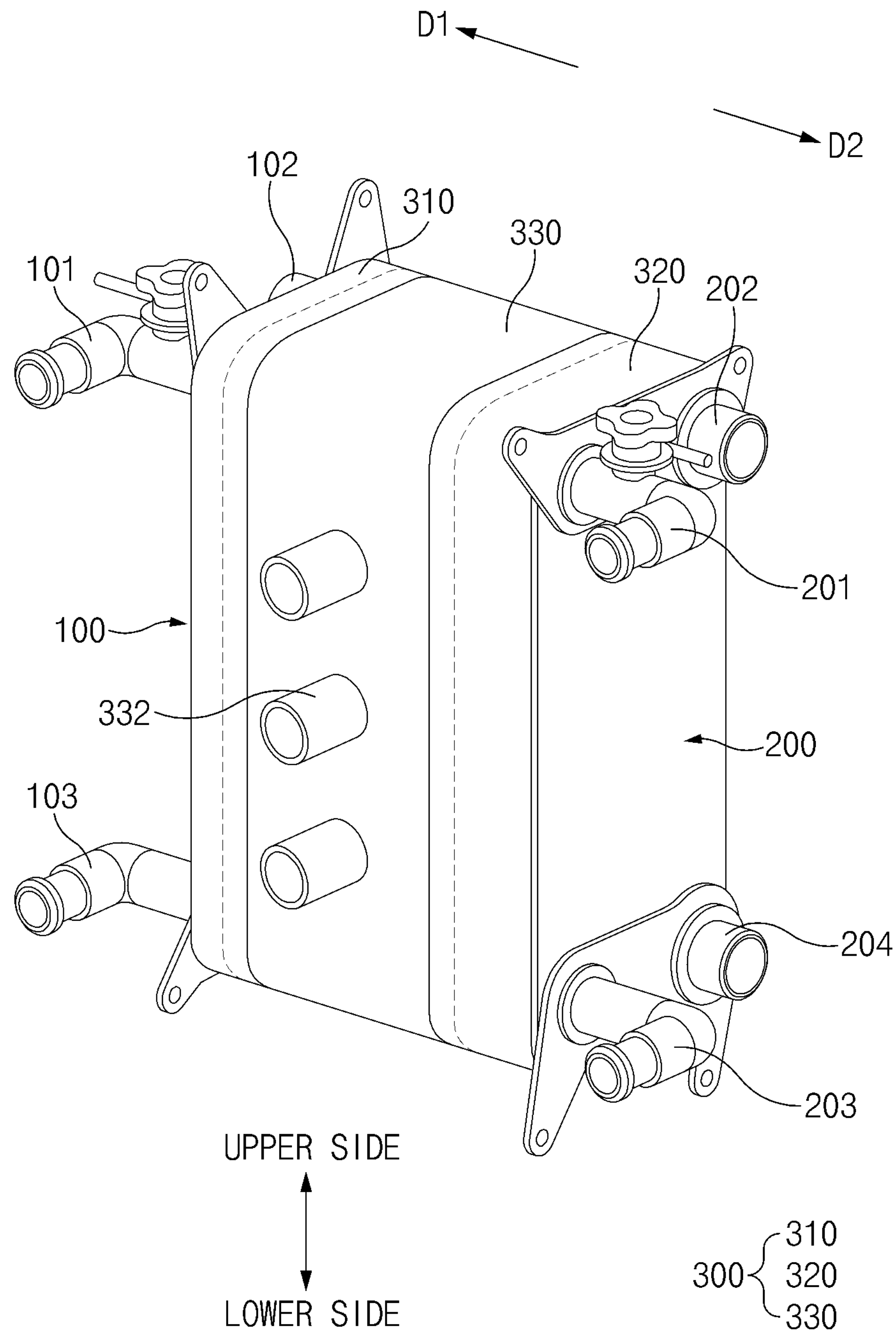
FIG. 1 illustrates an example heat exchanger assembly for a ship, in accordance with one or more embodiments.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

In the specification, a forward/rearward direction, a leftward/rightward direction, and an upward/downward direction are referred to for convenience of description, and may be directions that are perpendicular to each other. However, these directions are determined relative to a direction, in which a lamp is arranged, and the upward/downward direction may not necessarily mean a vertical direction.

One or more examples may provide provides a heat exchanger assembly for a ship that may increase a cooling efficiency and ensure a robustness.

The heat exchanger assembly for a ship, in accordance with one or more embodiments, may be a heat exchanger assembly for a ship that cools a fuel cell that is mounted on the ship.

Hereinafter, a basic principle of the fuel cell will be described in detail. The fuel cell stack may include a plurality of cells. The cell may include a membrane-electrode assembly (not illustrated), in which catalytic electrode layers that generate an electrochemical reaction are attached on opposite sides of an electrolyte membrane, through which protons flow, a gas diffusion layer (not illustrated) that uniformly distributes reaction gases and transfers the generated electric energy, and a separator (bipolar plate) (not illustrated) that moves reaction gases and cooling water.

More specifically, in the stack, hydrogen that is a fuel and oxygen that is an oxidizer may be supplied to the anode and the cathode of the membrane electrode assembly through a passage of the separator, respectively, and hydrogen may be supplied to the anode, and air may be supplied to the cathode.

The hydrogen supplied to the anode may be decomposed into protons and electrons by a catalyst in electrode layers on opposite sides of the electrolyte membrane, and only the protons may selectively pass through the electrolyte membrane that is a cation exchange membrane, and may be delivered to the cathode through the gas diffusion layer and the separator, which are conductors.

In the cathode, the protons supplied through the electrolyte membrane and the electrons delivered through the separator meet oxygen in the air supplied to the cathode by the air supply device, causing a reaction to generate water. Due to the travel of the protons, which occurs then, the electrons flow through an external conductor, and a current may be generated through the flow of the electrons.

For example, the heat exchanger assembly for a ship may be an assembly that includes a heat exchanger that cools electrical equipment of the fuel cell and a heat exchanger that cools the stack of the fuel cell.

Figure 2:
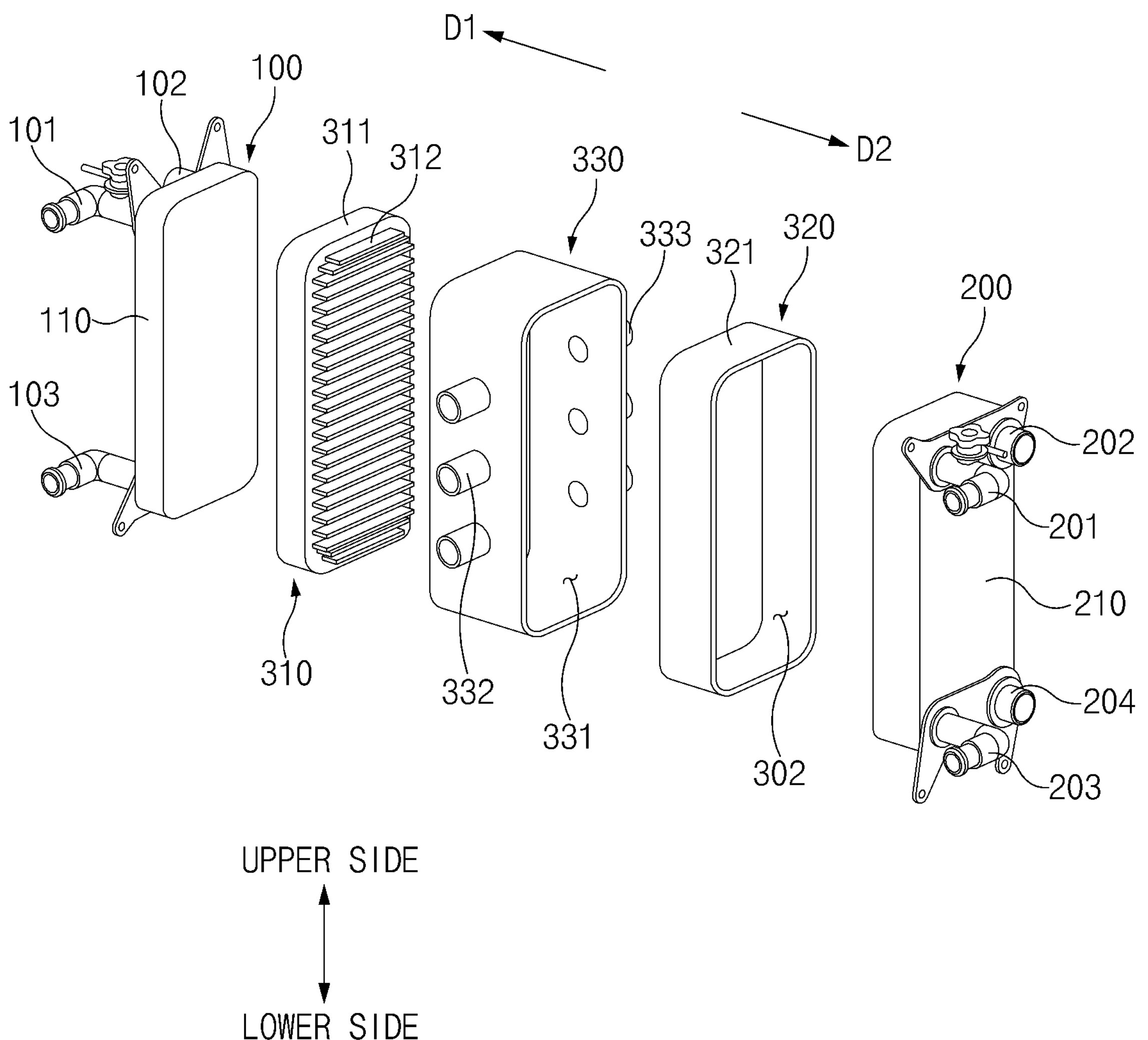
FIG. 2 illustrates an exploded perspective view of FIG. 1.
Figure 3:
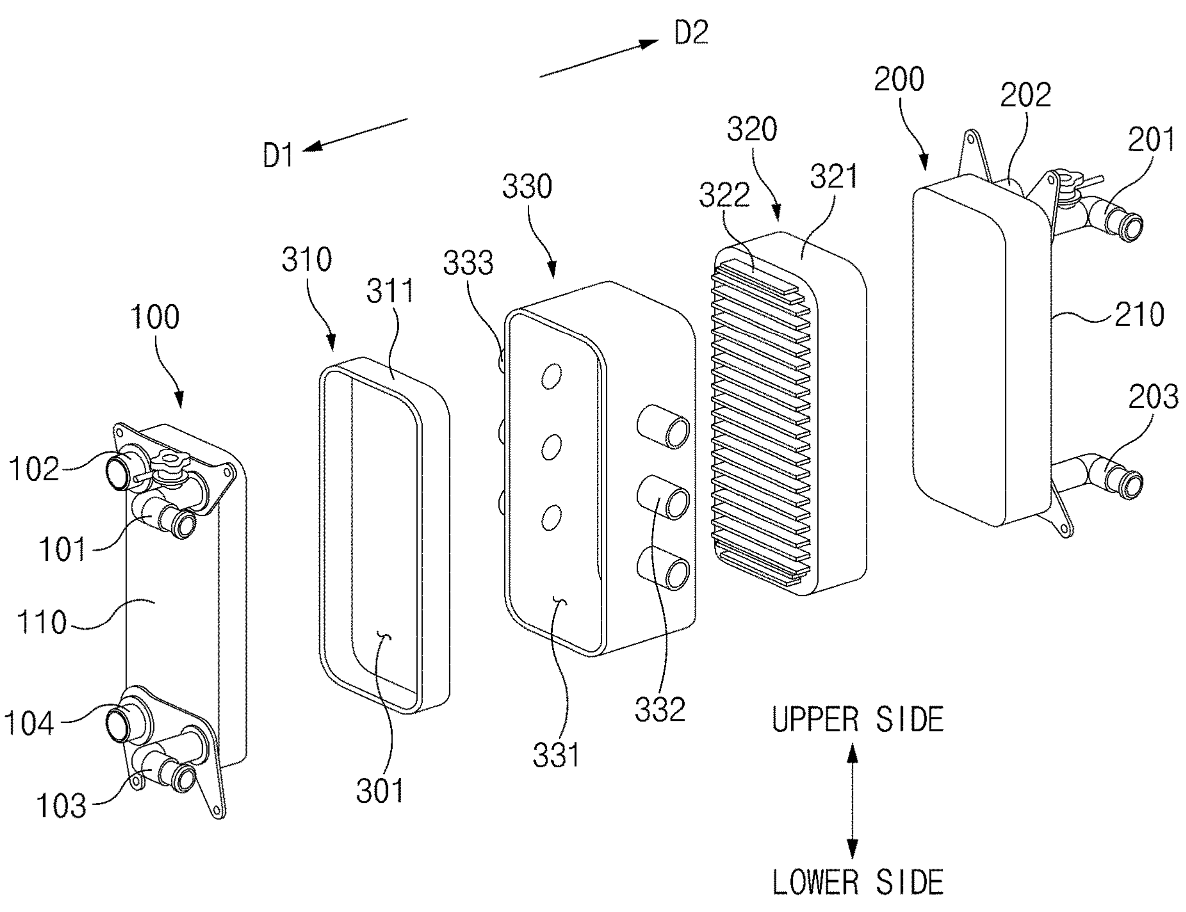
FIG. 3 is a view of FIG. 2 viewed from another direction.
Figure 4:
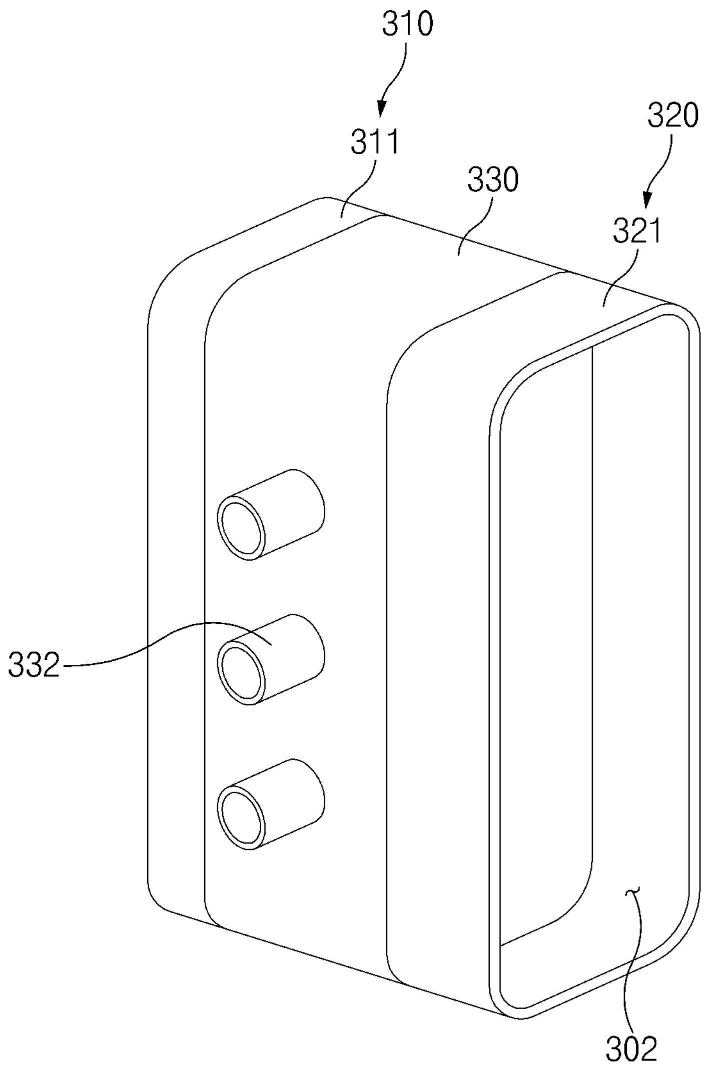
FIG. 4 illustrates a body part of an example heat exchanger assembly for a ship, in accordance with one or more embodiments.

FIG. 1 is a view illustrating a heat exchanger assembly for a ship, in accordance with one or more embodiments. FIG. 2 is an exploded perspective view of FIG. 1. FIG. 3 is a view of FIG. 2, which is viewed from another direction. FIG. 4 is a view illustrating a body part of the heat exchanger assembly for a ship, in accordance with one or more embodiments.

The heat exchanger assembly for a ship, in accordance with one or more embodiments, may include a first heat exchange part 100, a second heat exchange part 200, and a body part 300. The first heat exchange part 100 may be configured to cool the electrical equipment of the fuel cell in the ship. The second heat exchange part 200 may be configured to cool the fuel cell stack in the ship. The first heat exchange part 100 and the second heat exchange part 200 may be plate-shaped heat exchangers.

The first heat exchange part 100 may include a (1-1)-th pipe line 101, a (1-2)-th pipe line 102, a (1-3)-th pipe line 103, and a (1-4) pipe line 104. Among them, two pipe lines may be pipe lines, through which a fluid is introduced, and the remaining two pipe lines may be pipe lines, through which the fluid is discharged. The second heat exchange part 200 may include a (2-1)-th pipe line 201, a (2-2)-th pipe line 202, a (2-3)-th pipe line 203, and a (2-4)-th pipe line 204. Among them, two pipe lines may be pipe lines, through which the fluid is introduced, and the remaining two pipe lines may be pipe lines, through which the fluid is discharged.

The body part 300 may connect the first heat exchange part 100 and the second heat exchange part 200. The body part 300 may include a first opening 301 (FIG. 3) and a second opening 302 (FIG. 2). Assume that a direction, in which the body part 300 faces the first heat exchange part 100 is a first direction D1. The first opening 301 may be opened in the first direction D1 and the first heat exchange part 100 may be disposed therein. The second opening 302 may be opened in a second direction D2, which is opposite to the first direction D1, and the second heat exchange part 200 may be disposed therein.

In an example, the first heat exchange part 100 and the second heat exchange part 200 may be fixed through the body part 300 that houses and connects the first heat exchange part 100 and the second heat exchange part 200, and thus, a robustness of the heat exchanger assembly may be secured.

The body part 300 may include a first heat dissipating member 310, a second heat dissipating member 320, and a body member 330. The first heat dissipating member 310 may include the first opening 301. The second heat dissipating member 320 may be disposed in the second direction D2 of the first heat dissipating member 310, and may include the second opening 302.

The body member 330 may be disposed between the first heat dissipating member 310 and the second heat dissipating member 320 to connect the first heat dissipating member 310 and the second heat dissipating member 320. In an example, the lengths of the first heat dissipating member 310, the second heat dissipating member 320, and the body member 330 along the upward/downward direction may correspond to each other. In an example, an area, in which the first heat dissipating member 310 and the body member 330 are in contact, and an area, in which the second heat dissipating member 320 and the body member 330 are in contact, may be laser-welded to each other.

The length of the first heat dissipating member 310 along the first direction D1 may be different from the length of the second heat dissipating member 320 along the first direction D1. This means that the length of the first heat exchange part 100 along the first direction D1 may be different from the length of the second heat exchange part 200 along the first direction D1.

The first heat exchange part 100 may include a plurality of first plate-shaped members 110 that are stacked along the first direction D1. For reference, the drawing illustrates the first plate-shaped member 110 as if it was a single member. However, this is only an example, and is provided for convenience of illustration. The second heat exchange part 200 may include a plurality of second plate-shaped members 210 that are stacked along the second direction D2. The plurality of first plate-shaped members 110 may be disposed in the first opening 301, and the plurality of second plate-shaped members 210 may be disposed in the second opening 302.

The number of first plate-shaped members 110 and the number of second plate-shaped members 210 may be different. The length of the first heat dissipating member 310 along the first direction D1 may correspond to the length of the plurality of stacked first plate-shaped members 110 along the first direction D1. The length of the second heat dissipating member 320 along the second direction D2 may correspond to the length of the plurality of stacked second plate-shaped members 210 along the second direction D2.

The body part 300 may operate to assist cooling of the first heat exchange part 100 and the second heat exchange part 200 in addition to ensuring a robustness between the first heat exchange part 100 and the second heat exchange part 200. Hereinafter, a structure of the body part 300 for assisting cooling the first heat exchange part 100 and the second heat exchange part 200 will be described in detail.

The first heat dissipating member 310 may include a first heat dissipating member body 311 and a first pin part 312. The first heat dissipating member body 311 may be a part that defines the first opening 301. The first pin part 312 may protrude in the second direction D2 from the side of the first heat dissipating member body 311 in the second direction D2. The first pin part 312 may be a structure that increases a surface area to effectively dissipate the heat released from the first heat exchange part 100 through the first heat dissipating member body 311.

The second heat dissipating member 320 may include a second heat dissipating member body 321 and a second pin part 322. The second heat dissipating member body 321 may be a part that defines the second opening 302. The second pin part 322 may protrude in the first direction D1 from the side of the second heat dissipating member body 321 in the first direction D1. The second pin part 322 may be a structure that increases a surface area to effectively dissipate the heat released from the second heat exchange part 200 through the second heat dissipating member body 321.

A plurality of first pin parts 312 may be formed and arranged along the upward/downward direction, and a plurality of second pin parts 322 may be formed and arranged along the upward/downward direction.

The body part 300 may have an interior hole 331 that passes therethrough along the first direction D1, and the first pin part 312 and the second pin part 322 may be disposed in the interior hole 331. Furthermore, the body member 330 may include an introduction passage 332 and a discharge passage 333. The introduction passage 332 may be communicated with the interior hole 331, and may be configured such that an external cooling fluid is introduced therethrough. The discharge passage 333 may be communicated with the interior hole 331, and may be configured such that the external cooling fluid is discharged therethrough. The cooling fluid introduced into the interior hole 331 may be a substance that cools the first heat dissipating member 310 and the second heat dissipating member 320.

In an example, cooling of the first heat exchange part 100 and the second heat exchange part 200 may be assisted through an operation of the body part 300 to maintain the robustness of the first heat exchange part 100 and the second heat exchange part 200, and a cooling efficiency of the heat exchanger assembly may be increased.

In an example, a robustness of the heat exchanger assembly may be ensured because it includes parts that connect the heat exchanger for electrical equipment and the heat exchanger for the stack.

Additionally, in an example, the parts that connect the heat exchanger for the electrical equipment and the heat exchanger for the stack to assist the cooling of the heat exchanger, and thus the cooling efficiency may be increased.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A heat exchanger assembly, comprising:

a first heat exchange part configured to cool electrical equipment of a fuel cell;

a second heat exchange part configured to cool a fuel cell stack; and a body part configured to connect the first heat exchange part and the second heat exchange part, wherein the body part comprises:

a first opening that opens in a first direction, and the first heat exchange part is disposed in the first opening; and a second opening that opens in a second direction, and the second heat exchange part is disposed in the second opening, wherein the first direction is a direction in which the body part faces the first heat exchange part, and the second direction is opposite to the first direction, wherein the body part further comprises:

a first heat dissipating member which includes the first opening;

a second heat dissipating member, disposed in the second direction, and including the second opening; and a body member, disposed between the first heat dissipating member and the second heat dissipating member, and configured to connect the first heat dissipating member and the second heat dissipating member.

2. The heat exchanger assembly of claim 1, wherein a length of the first heat dissipating member along the first direction is different from a length of the second heat dissipating member along the first direction.

3. The heat exchanger assembly of claim 2, wherein the first heat exchange part comprises a plurality of first plate-shaped members stacked along the first direction, wherein the second heat exchange part comprises a plurality of second plate-shaped members stacked along the second direction, wherein the plurality of first plate-shaped members are disposed in the first opening, and wherein the plurality of second plate-shaped members are disposed in the second opening.

4. The heat exchanger assembly of claim 3, wherein a number of the first plate-shaped members is different from a number of the second plate-shaped members, wherein the length of the first heat dissipating member along the first direction corresponds to a length of the plurality of stacked first plate-shaped members along the first direction, and wherein a length of the second heat dissipating member along the second direction corresponds to a length of the plurality of stacked second plate-shaped members along the second direction.

5. The heat exchanger assembly of claim 1, wherein the first heat dissipating member comprises:

a first heat dissipating member body that defines the first opening; and a first pin part that protrudes in the second direction from a side surface of the first heat dissipating member body, and wherein the second heat dissipating member comprises:

a second heat dissipating member body that defines the second opening; and a second pin part that protrudes in the first direction from a side surface of the second heat dissipating member body.

6. The heat exchanger assembly of claim 5, wherein a plurality of first pin parts are disposed in a vertically stacked direction, and wherein a plurality of second pin parts are arranged along the vertically stacked direction.

7. The heat exchanger assembly of claim 6, wherein the body part is configured to have an interior hole that passes therethrough along the first direction, and wherein the first pin part and the second pin part are disposed in the interior hole.

8. The heat exchanger assembly of claim 7, wherein the body member comprises:

an introduction passage that is communicated with the interior hole, and is configured such that an external cooling fluid is introduced therethrough; and a discharge passage that is communicated with the interior hole, and is configured such that the external cooling fluid is discharged therethrough.

9. The heat exchanger assembly of claim 1, wherein a length of the first heat dissipating member, a length of the second heat dissipating member, and a length of the body member correspond to each other in a vertical direction, and wherein an area, in which the first heat dissipating member and the body member contact each other, and an area, in which the second heat dissipating member and the body member contact each other, are laser-welded to each other.

* * * * *